United States Patent
Seo et al.

(10) Patent No.: US 8,238,970 B2
(45) Date of Patent: Aug. 7, 2012

(54) MOBILE COMMUNICATION TERMINAL HAVING AROMATIC FUNCTION AND COMMUNICATION TERMINAL CHARGER HAVING AROMATIC CHARGE FUNCTION

(75) Inventors: Ja-Won Seo, Suwon-si (KR); Young-Kwon Yoon, Seoul (KR); Yong-Gu Lee, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 780 days.

(21) Appl. No.: 12/274,424

(22) Filed: Nov. 20, 2008

(65) Prior Publication Data

US 2009/0137288 A1    May 28, 2009

(30) Foreign Application Priority Data

Nov. 28, 2007  (KR) .................. 10-2007-0122247

(51) Int. Cl.
 *H04M 1/00* (2006.01)
(52) U.S. Cl. .............. 455/556.1; 455/573; 455/90.1; 455/66.1; 455/575.1; 455/90.3; 455/567; 381/177; 222/145.1; 222/145.5; 222/145.6; 392/390; 428/905
(58) Field of Classification Search .......... 455/556.1, 455/573, 90.1, 66.1, 575.1, 90.3, 567; 381/177; 222/145.1, 145.5, 145.6; 600/365; 428/905
See application file for complete search history.

(56) References Cited

U.S. PATENT DOCUMENTS

| | | | | |
|---|---|---|---|---|
| 7,152,758 | B2 * | 12/2006 | Fazzio et al. | 222/145.1 |
| 7,200,363 | B2 * | 4/2007 | Greco et al. | 455/66.1 |
| 7,310,539 | B2 * | 12/2007 | Chiang et al. | 455/567 |
| 7,512,415 | B2 * | 3/2009 | Fazzio et al. | 455/556.1 |
| 2004/0204043 | A1 * | 10/2004 | Wang et al. | 455/556.1 |
| 2004/0235430 | A1 * | 11/2004 | Ma et al. | 455/90.1 |
| 2006/0062408 | A1 * | 3/2006 | Cho et al. | 381/177 |
| 2006/0258409 | A1 * | 11/2006 | Kogan | 455/573 |
| 2008/0020794 | A1 * | 1/2008 | Garon et al. | 455/556.1 |

FOREIGN PATENT DOCUMENTS

| | | |
|---|---|---|
| KR | 2004-7070 | 1/2004 |
| KR | 20-2004-19400 | 9/2004 |
| KR | 20-0363294 | 9/2004 |
| KR | 2006-62118 | 6/2006 |

* cited by examiner

*Primary Examiner* — April G Gonzales
(74) *Attorney, Agent, or Firm* — Cha & Reiter, LLC

(57) ABSTRACT

Provided is a mobile communication terminal having an aromatic function and a terminal charger for the same. The terminal charger for charging a mobile terminal having an absorbent material disposed therein includes a charger body having a mounting space formed at one part thereof and in which the terminal is mounted; and an aromatic supply part installed in the charger body for supplying an aromatic agent into the absorbent material.

18 Claims, 6 Drawing Sheets

MOBILE COMMUNICATION TERMINAL HAVING AROMATIC FUNCTION AND COMMUNICATION TERMINAL CHARGER HAVING AROMATIC CHARGE FUNCTION

CLAIM OF PRIORITY

This application claims the benefit of the earlier filing date, under 35 U.S.C. §119(a), to that patent application entitled "MOBILE COMMUNICATION TERMINAL HAVING AROMATIC FUNCTION AND COMMUNICATION TERMINAL CHARGER HAVING AROMATIC CHARGE FUNCTION" filed in the Korean Intellectual Property Office on Nov. 28, 2007 and assigned Serial No. 10-2007-0122247, the entire contents of which are hereby incorporated herein by reference.

BACKGROUND OF THE INVENTION

1. Field of the Invention

The present invention relates to a mobile communication terminal and a communication terminal charger, and more particularly, to a mobile communication terminal having an aromatic function capable of injecting an aromatic agent into the mobile communication terminal with an absorbent material, and a communication terminal charger having an aromatic charge function and a terminal charge function.

2. Description of the Related Art

With an increase in distribution of mobile phones, many more people are carrying mobile phones with them and using the mobile phones frequently.

However, talking on the mobile phones for an extended period of time may cause users headaches or other head troubles due to electronic waves emitted from antennas.

In order to solve these problems, a cellular phone with an LCD cover material having as a function the emission of an incense (Korean Utility Model Registration No. 20-363294) and a keypad button for exhalation of fragrance in a phone (Korean Patent Laid-open Publication No. 10-2004-7070) have been proposed.

However, Korean Utility Model Registration No. 20-363294 always emits a fragrance, and the aromatic agent is readily exhausted.

In order to solve the problems, Korean Patent Laid-open Publication No. 10-2006-0062118 discloses a mobile phone including a mobile phone body, a mobile phone battery coupled to the mobile phone body, and a fragrance member, attached to the mobile phone body or the mobile phone battery, emitting a fragrance, wherein the fragrance member emits fragrance by the heat generated from the mobile phone body or the mobile phone battery.

The fragrance member of the mobile phone is installed at one surface of the battery and emits a fragrance at a predetermined temperature using the heat from the battery. In this case, however, when the fragrance material in the fragrance member is exhausted, another fragrance member should be used or a battery cover should be separated from the mobile phone body in order to supplement a new fragrance material into the fragrance member.

In addition, a mobile phone employing a new technology has been developed, which includes a plurality of fragrance storage parts installed at a mobile phone body, each emitting a fragrance when certain conditions are satisfied, and a circuit part provided in a substrate of the mobile phone body to drive the fragrance storage parts, wherein the circuit part controls opening of the fragrance storage parts to emit fragrance when the certain conditions, for example, arrival of a message or a telephone call, are satisfied.

However, in the above technology, in order to inject perfume when the certain conditions are satisfied, the mobile phone must include the additional circuit part.

In addition, the mobile phone must additionally include the fragrance storage parts for storing various perfumes, thus causing an increase in size of the mobile phone.

SUMMARY OF THE INVENTION

The present invention provides a mobile communication terminal having an aromatic function capable of injecting an amount of aromatic agent into a mobile phone terminal body having an absorbent material installed therein or a cover member detachably coupled to the terminal body to perform the aromatic function, and a terminal charger having an aromatic charge function and a terminal charge function.

The present invention also provides a mobile communication terminal having an aromatic function capable of excluding an additional circuit for providing the aromatic function to the terminal body and reducing the weight of the terminal by installing an aromatic supply part at a charging device, not the terminal body, and a terminal charger capable of supplying an aromatic agent into an absorbent material in a terminal body when a terminal is charged and also supplying an aromatic agent into the absorbent material in the terminal body even when the terminal is not being charged.

According to an aspect of the present invention, there is provided a mobile communication terminal having an aromatic function including a terminal body having a display window provided at one side and a battery provided at the other side, and an absorbent material installed in the terminal body for absorbing a supplied aromatic.

Here, the terminal body may include a detachable cover member.

The cover member may include a cover member body having an insertion space formed therein to accommodate the absorbent material, a plurality of holes formed in one surface of the cover member body to expose the insertion space to the exterior, an injection hole formed in the one surface of the cover member body to inject the aromatic agent, and an insertion hole formed in the other surface of the cover member body and in communication with the insertion space to insert the absorbent material; and an opening/closing cap inserted into the insertion hole to open/close the insertion hole.

In addition, the cover member may be disposed at one side of the terminal body.

Further, the cover member may be disposed at the other side of the terminal body.

Furthermore, the cover member may be disposed at the other side of the terminal body to cover the battery.

According to another aspect of the present invention, there is provided a terminal charger for charging a mobile terminal having an absorbent material disposed therein, which includes a charger body having a mounting space formed at one part thereof and an aromatic supply part installed at the charger body and supplying a certain amount of aromatic agent into the absorbent material. The terminal is mounted within the mounting space.

Here, the charger body may have an installation hole for communicating with the mounting space of the charger body, and formed a known angle with respect to a lower surface of the charger body.

In addition, the aromatic supply part may include a first body having a storage space for storing a known amount of aromatic agent therein, a second body formed at one end of the first body to be in communication with the storage space and having a conical shape, a third body formed at a tip of the second body to project, by a certain length, to expose the storage space to the exterior, an opening/closing means having an opening/closing cone disposed in the second body and having a conical shape to be in contact with an inner surface of the second body and a push rod extending from one end of the opening/closing cone through the third body, and a resilient member disposed in the first body to support a bottom surface of the opening/closing cone and an inner bottom surface of the first body.

Here, the first body may further include a main window formed of a transparent material.

In addition, the charger body may further include a sub window formed of a transparent material to expose the installation hole to the exterior.

Further, the installation hole may be formed with a first installation hole into which the third body is inserted and from which an end of the third body projects to the exterior of the mounting space, a second installation hole into which the second body is inserted, and a third installation hole into which the first body is inserted.

Furthermore, an outer surface of the second body may be threadedly engaged with an inner surface of the second installation hole.

In addition, the installation hole may be inclined to form an acute angle with respect to a lower surface of the charger body.

Meanwhile, the terminal may include a terminal body having a display window provided at a first side thereof and a battery provided at a second part, and an absorbent material installed in the terminal body for absorbing an aromatic agent supplied from the third body.

Here, the terminal body may include a detachable cover member.

The cover member may include a cover member body having an insertion space formed therein to accommodate an absorbent material, a plurality of holes formed in one surface of the cover member body to expose the insertion space to the exterior, an injection hole formed in the one surface of the cover member body, into which one end of the third body is inserted, such that the aromatic agent stored in the first body is injected when a push rod is pushed to space the opening/closing cone from an inner surface of the second body, and an insertion hole formed in the other surface of the cover member body and in communication with the insertion space to insert the absorbent material; and an opening/closing cap inserted into the insertion hole to open/close the insertion hole.

In addition, the cover member may be disposed at one side of the terminal body.

Further, the cover member may be disposed at the other side of the terminal body.

Furthermore, the cover member may be disposed at the other side of the terminal body to cover the battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate like components, wherein.

DETAILED DESCRIPTION OF THE INVENTION

Reference will now be made in detail to the embodiments of the present invention, examples of which are illustrated in the accompanying drawings. The embodiments are described below in order to explain the present invention by referring to the figures.

Figure 1:
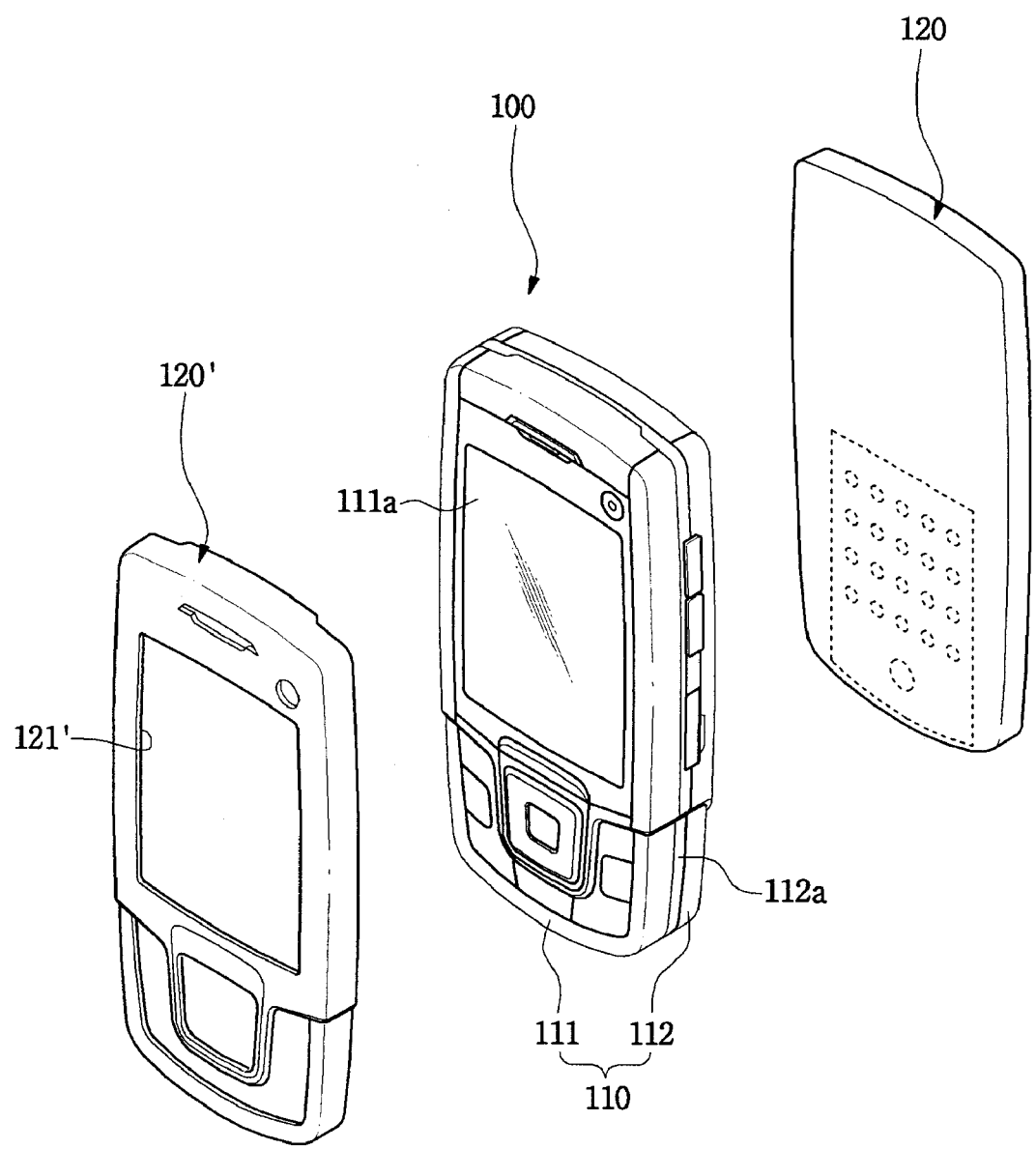
FIG. 1 is a perspective view of a mobile terminal having an aromatic function in accordance with an exemplary embodiment of the present invention.
Figure 2:
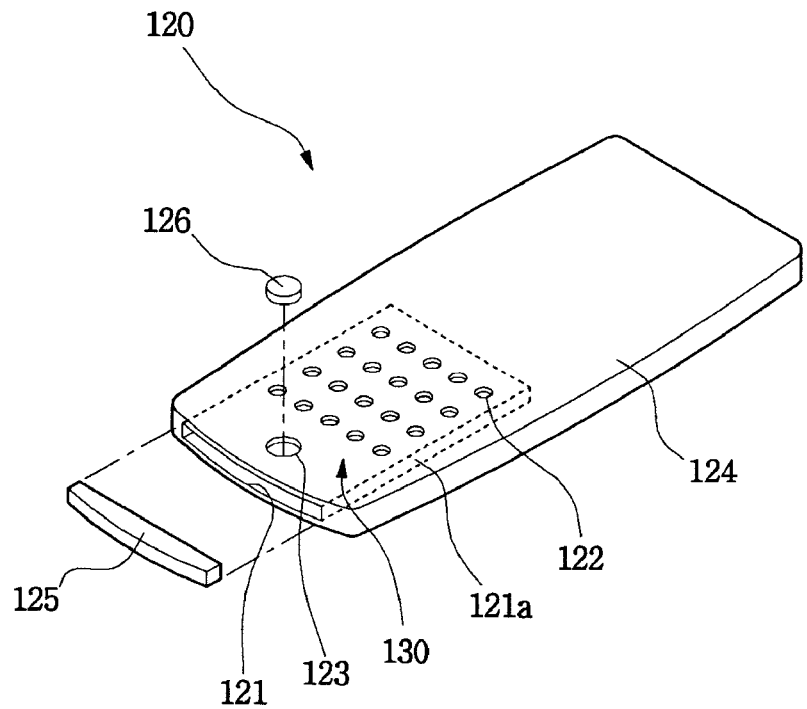
FIG. 2 is a perspective view of a cover member in accordance with an exemplary embodiment of the present invention.
Figure 3:
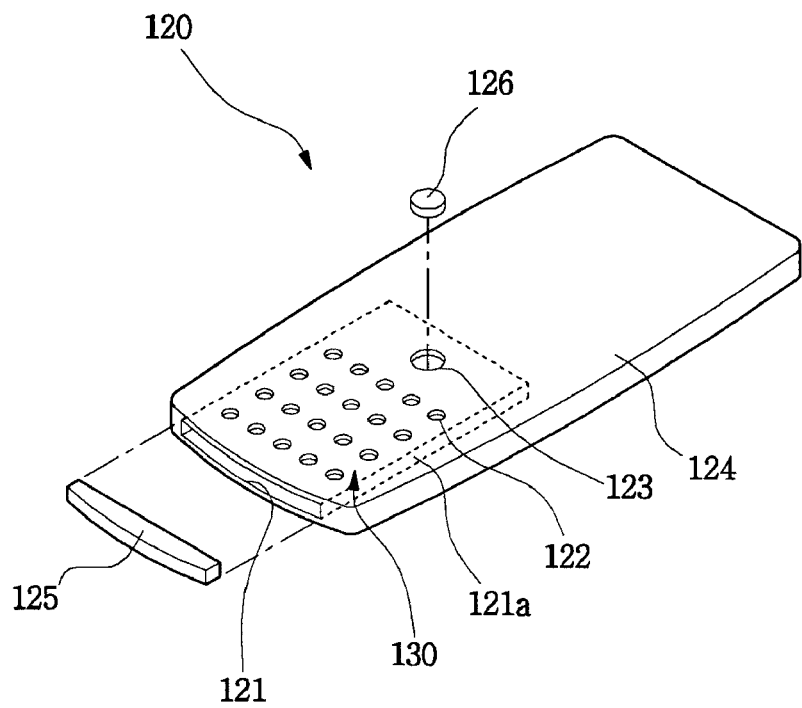
FIG. 3 is a perspective view of a cover member in accordance with another exemplary embodiment of the present invention.

FIG. 1 is a perspective view of a mobile terminal having an aromatic function in accordance with an exemplary embodiment of the present invention, FIG. 2 is a perspective view of a cover member in accordance with an exemplary embodiment of the present invention, and FIG. 3 is a perspective view of a cover member in accordance with another exemplary embodiment of the present invention.

First, constitution of the mobile terminal in accordance with an exemplary embodiment of the present invention will be described with reference to FIGS. 1 to 3.

Referring to FIG. 1, the mobile terminal 100 in accordance with an exemplary embodiment of the present invention includes a terminal body 110. The terminal body 110 includes a main body 111 having a display window 111a, such as an LCD, and a sub-body 112 connected to the main body 111 and having a board (not shown) and a keypad (not shown) in communication with the display window 111a, and a battery 112a for supplying power to the board.

The main body 111 and the sub-body 112 may be hinged to each other at their one ends (i.e., a folder type terminal), or may be slid along each other (i.e., a slide type terminal). Both these exemplary styles are known in the art and need not be described in detail herein.

In addition, the main body 111 and the sub-body 112 include cover members 120 and 120' attached to their outer surfaces, respectively.

The cover member 120' installed at the main body 111 has an opening 121' exposing the display window to the exterior.

The cover member 120 installed at the sub-body 112 is disposed at a rear surface of the sub-body 112 to protect the battery 112a from the exterior.

Constitution of the cover member 120 will be described in detail with reference to FIGS. 2 and 3.

Here, the cover member 120 installed at the rear surface of the sub-body 112 will be described as a representative example.

FIG. 2 shows the cover member 120 installed at the rear surface of the sub-body 112.

Referring to FIG. 2, the cover member 120 includes a cover member body 124 having an insertion space 121a formed therein to accommodate the absorbent material 130, such as sponge, a plurality of holes 122 formed in one surface of the cover member body 124 to expose the insertion space 121a to the exterior, an injection hole 123 formed in the one surface of the cover member body 124 to allow for the injection of an aromatic agent, and an insertion hole 121 formed in the other surface of the cover member body 124 and in communication with the insertion space 121a to insert the absorbent material; and an opening/closing cap 125 inserted into the insertion hole 121 to open/close the insertion hole 121.

A circular opening/closing cap 126 may be inserted into the injection hole 123.

The absorbent material 130 may be a sponge having width, length, and thickness to occupy a portion of, or the entire, insertion space.

The absorbent material 130 is located in the insertion space 121a through the insertion hole 121.

In addition, the insertion hole 121 can be blocked from the exterior by inserting the opening/closing cap 125 such that separation of the absorbent material from the insertion space 121a can be prevented.

Further, the circular opening/closing cap 126 is inserted into the injection hole 123 to prevent introduction of foreign substances.

Meanwhile, as shown in FIG. 2, the injection hole 123 can be located at a lower end of the cover member body 124, i.e., under the plurality of holes 122.

Therefore, the absorbent material 130 disposed in the insertion space 121a is exposed through the holes 122 such that an aromatic agent can be supplied through the injection hole 123.

In addition, as shown in FIG. 3, the injection hole 123 may be disposed in the middle of the cover member body 124, i.e., over the plurality of holes 122, in another aspect of the invention.

In this case, the cover member body 124 is disposed at the other side of the terminal body 110, i.e., the rear surface of the sub-body 112 to cover the battery 112a.

Further, as shown in FIG. 1, the cover member 120' may be disposed at one side of the terminal body 110, i.e., a front surface of the main body 111.

At this time, the cover member 120' disposed at the front surface of the main body 111 has the same constitution as described above.

While the cover member 120 or 120' as described above and shown in FIG. 1 can be detached from the surface of the main body 111 or the sub body 112, the cover member 120 or 120' may be integrally formed with the main body 111 or the sub-body 112.

Hereinafter, constitution of a terminal charger in accordance with an exemplary embodiment of the present invention will be described with reference to FIGS. 4 to 9.

Figure 4:
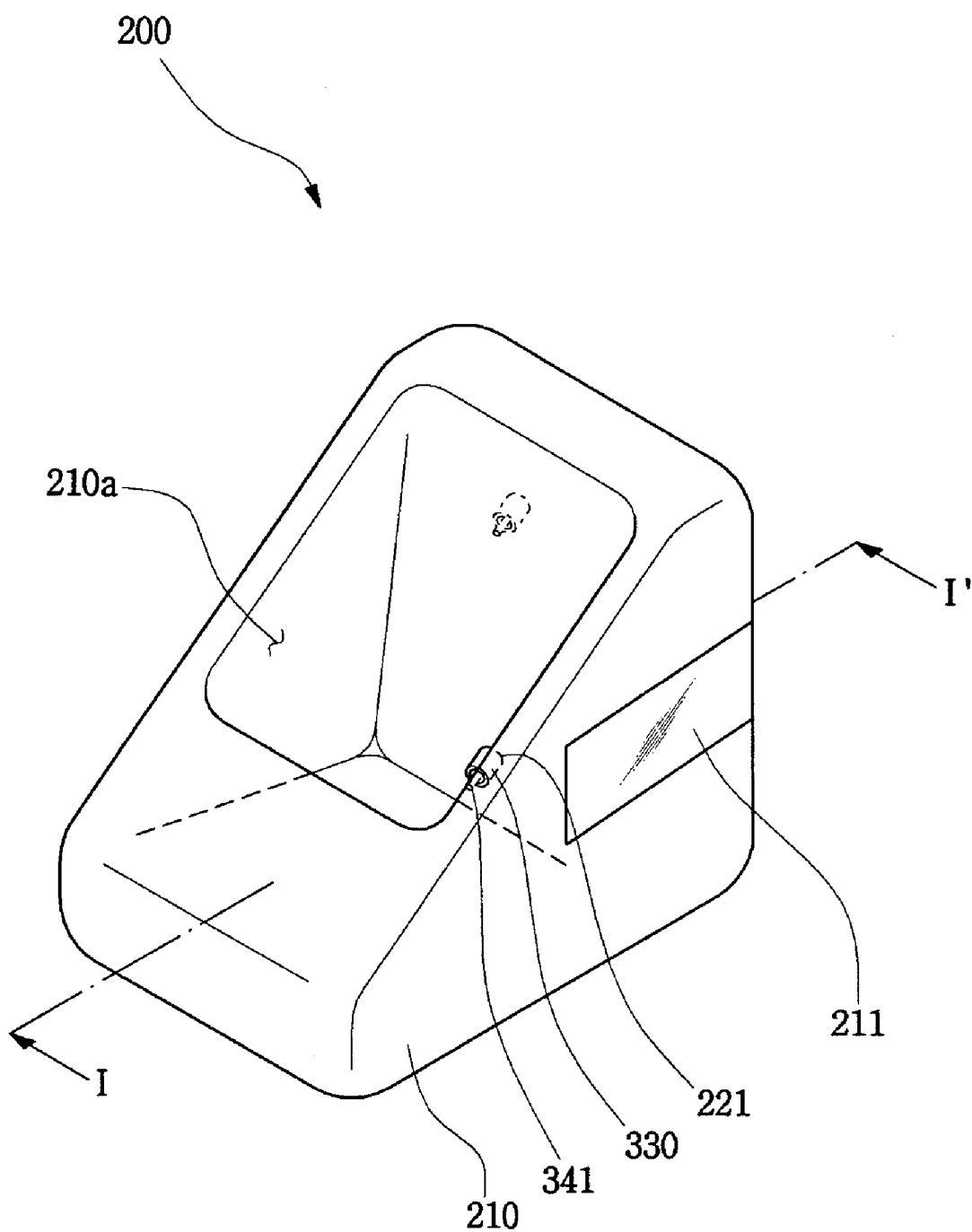
FIG. 4 is a perspective view of a terminal charger in accordance with an exemplary embodiment of the present invention.
Figure 5:
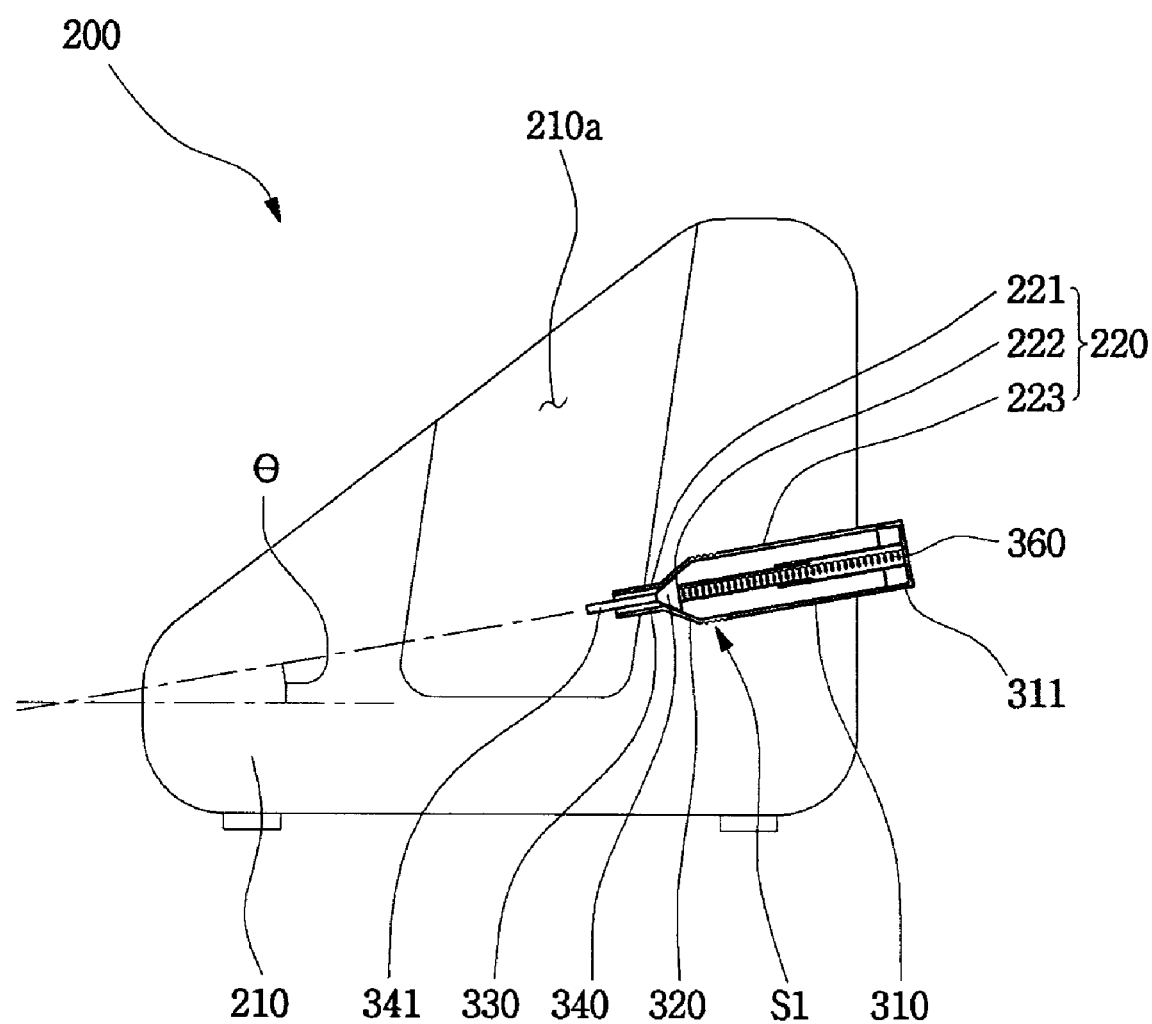
FIG. 5 is a cross-sectional view taken along the line I-I' of FIG. 4.
Figure 6:
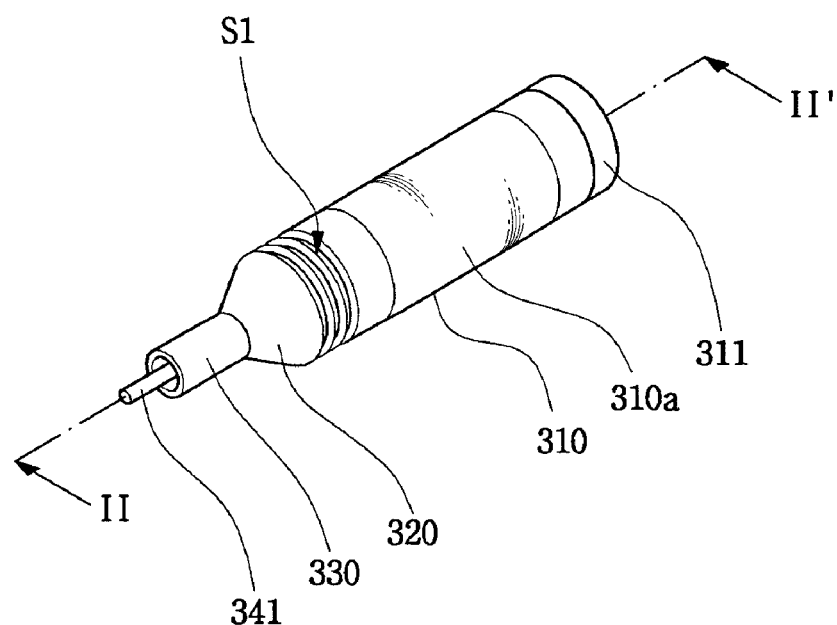
FIG. 6 is a perspective view of an aromatic supply part in accordance with an exemplary embodiment of the present invention.
Figure 7:
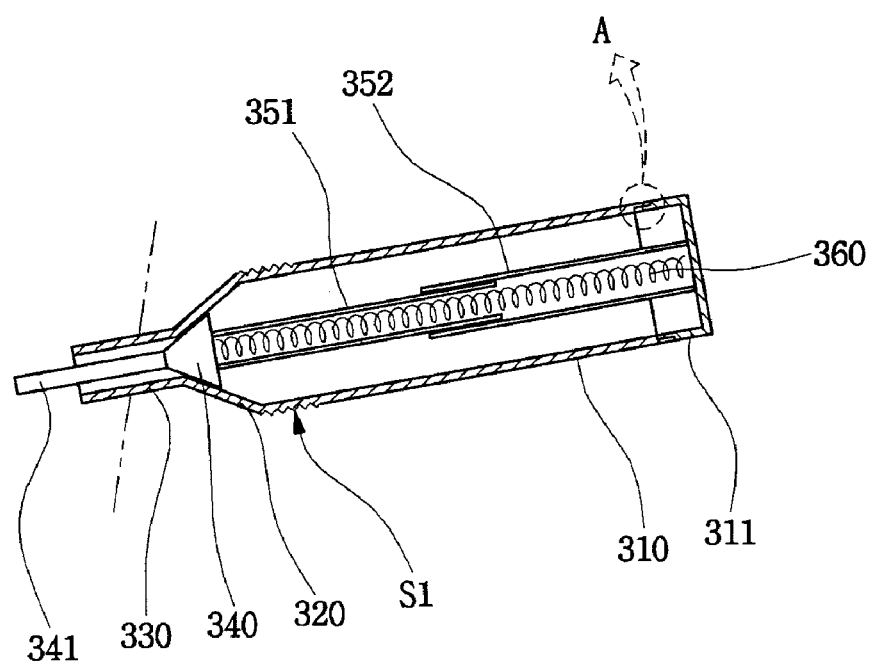
FIG. 7 is a cross-sectional view taken along the line II-II' of FIG. 6.
Figure 8:
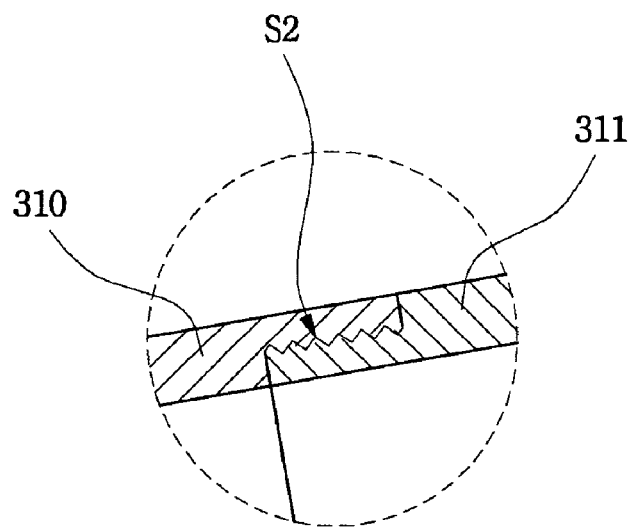
FIG. 8 is an enlarged cross-sectional view of an A-portion shown in FIG. 7.
Figure 9:
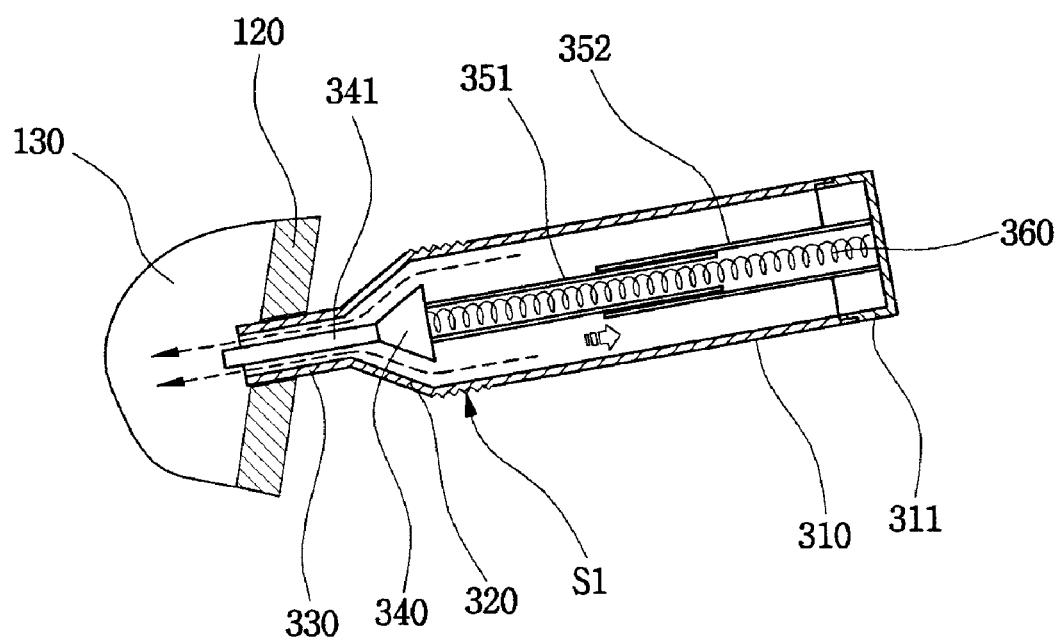
FIG. 9 is a cross-sectional view showing a state after the aromatic supply part shown in FIG. 7 is operated.

FIG. 4 is a perspective view of a terminal charger in accordance with an exemplary embodiment of the present invention, FIG. 5 is a cross-sectional view taken along the line I-I' of FIG. 4, FIG. 6 is a perspective view of an aromatic supply part in accordance with an exemplary embodiment of the present invention, FIG. 7 is a cross-sectional view taken along the line II-II' of FIG. 6, FIG. 8 is an enlarged cross-sectional view of an A-portion shown in FIG. 7, and FIG. 9 is a cross-sectional view showing a state after the aromatic supply part shown in FIG. 7 is operated.

The terminal charger 200 includes a charger body 210 having a mounting space 210a formed at one side thereof, on which the terminal body 110 shown in FIGS. 1 to 3 is mounted.

The charger body 210 includes an aromatic supply part 300 for supplying an aromatic agent into the absorbent material 130.

Hereinafter, the charger body 210 will be described.

Referring to FIGS. 4 and 5, the charger body 210 has an installation hole 220 passing from one side through to the other side thereof and in which the aromatic supply part 300 is installed.

The installation hole 220 allows communication between the mounting space 210a and the other side of the charger body 210, and is inclined at a predetermined angle Θ with respect to a lower surface of the charger body 210.

In one aspect, the installation hole 220 is inclined downward from the other side to the one side of the charger body 210.

The aromatic supply part 300 includes a first body 310 having a storage space for storing an amount of aromatic agent, a second body 320 having a conical shape and formed at one end of the first body 310 in communication with the storage space, and a third body 330 having a hollow shape and formed at one end of the second body 320 to project to a certain length to expose the storage space to the exterior.

In addition, a cap 311 is (S2) engaged with one end of the first body 310, as shown in FIG. 8. In one aspect of the invention, the cap 311 may include a thread that allows the cap to be threadly engaged to the first body 310.

When the cap 311 is separated from the first body 310, the first body 310 is exposed to the exterior, and an aromatic agent can be injected into the exposed first body 310.

The second body 320 and the third body 330 include an opening/closing means installed therein.

The opening/closing means 340 includes an opening/closing cone 340, and a push rod 341 extending from one end of the opening/closing cone 340 to a certain length.

Specifically, the opening/closing cone 340 is disposed in the second body 320. The opening/closing cone 340 has a conical shape to be in contact with an inner surface of the second body 320.

In addition, the push rod 341 extends from one end of the opening/closing cone 340 to a certain length to be exposed to the exterior through the third body 330.

Further, a resilient member 360 is installed in the first body 310 to support a lower surface of the opening/closing cone 340 and an inner lower surface of the first body 310 to oppose each other.

One end of the resilient member 360 is supported by the lower surface of the opening/closing cone 340, and supported by an inner surface of the cap 311.

In addition, a first guide pipe 351 having a first diameter is installed at the lower surface of the opening/closing cone 340, and a second guide pipe 352 having a second diameter larger than the first diameter is installed at the inner surface of the cap 311.

Therefore, the first guide pipe 351 can be inserted into the second guide pipe 352 to be slid therein.

Here, the resilient member 360 is disposed in the first and second guide pipes 351 and 352.

Meanwhile, the installation hole 220 is formed with a first installation hole 221 into which the third body 330 is inserted and through which an end of the third body 330 partially projects to the exterior of the mounting space 210a, a second installation hole 222 into which the second body 320 is inserted, and a third installation hole 223 into which the first body 310 is inserted.

The outer surface of the second body 320 may be threadedly engaged with the inner surface of the second installation hole 222.

Meanwhile, the first body 310 of the aromatic supply part 300 further includes a main window 310a.

The main window 310a is formed of a transparent material to visually expose the interior of the first body 310 to the exterior.

Therefore, it is possible to visually check capacity of the aromatic agent stored in the first body 310 through the main window 310a.

In addition, the charger body 210 may further include a sub window 211 exposing the main window 310a to the exterior.

Therefore, it is possible to visually check capacity of the aromatic agent stored in the first body 310 from the exterior of the charger body 210 through the sub window 211 in a state in which the aromatic supply part 300 is not detached from the installation hole 220.

Meanwhile, the terminal charger 200 can electrically charge the terminal body 110 mounted in the mounting space 210a and supply the aromatic agent from the aromatic supply part 300 into the absorbent material to supply a certain amount of aromatic agent. In addition, the terminal charger 200 can be used as a holder in which the terminal body 110 is mounted in the mounting space 210a, when a terminal charge function, i.e., a charge element electrically connected to the terminal 100 to charge the battery 112a is excluded.

Hereinafter, operations and effects of the terminal charger for charging a mobile terminal having an aromatic function in accordance with an exemplary embodiment of the present invention will be described.

The terminal body 110 shown in FIG. 1 is mounted in the mounting space 210a provided in the charger body 210 shown in FIGS. 4 and 5.

At this time, the battery 112a of the terminal body 110 can be charged by the charger body 210 by physically connecting leads (not shown) provided in one side of the terminal body 110 with leads (not shown) provided in the mounting space 210a.

In addition, the cover member 120 installed at the rear surface of the sub body—112 is closely adhered to one surface of the mounting space 210a.

Referring to FIG. 9, the third member 330 projecting from the first installation hole 221 is inserted into the injection hole 123 formed in the cover member 120, and, at this time, one end of the push rod 341 projecting from the third body 330 is inserted into the injection hole 123 (FIG. 2) to be in direct contact with the absorbent material 130 to be pressed.

As the one end of the push rod 341 is pushed into the third body 330, the opening/closing cone 340 provided at the other end of the push rod 341 is separated from the inner surface of the second body 320 to move toward the other end of the first body 310, i.e., cap 311.

When the opening/closing cone 340 moves toward the cap 311, the first guide pipe 351 is inserted into the second guide pipe 352 to move in a direction indicated by the arrow, and the resilient member 360 disposed in the first and second pipes 351 and 352 is compressed.

In this case, the resilient member 360 has a recovering resilient force.

When the outer surface of the opening/closing cone 340 is separated from the inner surface of the second body 320, the aromatic agent stored in the first body 310 through the space therebetween is discharged to the exterior through the space and the interior of the third body 330.

Then, the discharged aromatic agent moves to the absorbent material 130 disposed in the insertion space 121a of the cover member 120 to be absorbed into the absorbent material 130 through the injection hole 123.

As described above, after the aromatic agent is absorbed into the absorbent material 130, the sub body 112 can be detached from the charger body.

Then, the resilient member 360 is returned to its original position. Therefore, the opening/closing cone 340 moves such that the outer surface of the cone 340 is in close contact with the inner surface of the second body 320, and the push rod 341 is returned to partially project from the third body 330.

In addition, a circular opening/closing cap 126 formed of a rubber material is inserted into the injection hole 123 such that introduction of foreign substances into the absorbent material through the injection hole 123 can be prevented.

Therefore, the aromatic agent absorbed into the absorbent material 130 can be emitted to the exterior through the plurality of holes 122 formed in the cover member 120.

As described above, a process in which the aromatic agent is supplied and absorbed into the absorbent material 130 disposed in the cover member 120 installed at the rear surface of the sub body 112 has been described as an example.

However, the aromatic supply part 300 in accordance with an exemplary embodiment of the present invention can supply an aromatic agent into the absorbent material 130 of the cover member 120' installed the main body 111 shown in FIG. 1.

In this case, the cover member 120' is removed from the outer surface of the main body 111 to insert the injection hole 123 of the cover member 120' into the third body 330 of the aromatic supply part 300 installed in the installation hole 220 in accordance with the present invention such that the aromatic agent can be supplied into the absorbent material 130 shown in FIG. 9 and as described above.

Here, since the cover member 120' has the same constitution as shown in FIGS. 2 and 3, the injection hole 123 is designated by reference numeral 123.

In addition, the aromatic supply part 300 is disposed in the installation hole 220 of the charger body 210 to be inclined downward from the other side to the one side of the charger body 210.

Therefore, the aromatic agent contained in the first body 310 can be readily moved toward the second body 320 and the third body 330 to be introduced into the injection hole 123 inserted into the end of the third body 330.

Meanwhile, an aromatic agent can be injected into the absorbent material 130 disposed in the cover member 120' of the main body 111 and the cover member 120 of the sub body 112 shown in FIG. 1 without using the terminal charger 200, in accordance with the present invention.

That is, when one end of the third body 330 of the aromatic supply part 300 in accordance with the present invention is inserted into the injection hole 123 formed in the cover member 120, one end of the push rod 341 partially projecting from the third body 330 is pushed inward to the first body 310 as shown in FIG. 9.

Therefore, the outer surface of the opening/closing cone 340 connected to the other end of the push rod 341 is spaced a predetermined distance from the inner surface of the second body 320 to form a space therebetween.

Then, the aromatic agent stored in the first body moves through the space to be injected into the absorbent material 130 through the third body 330.

As can be seen from the foregoing, it is possible to inject an amount of aromatic agent into an absorbent material installed in a mobile phone terminal body or a cover member detachably coupled to the terminal body to perform the aromatic function, thereby performing both an aromatic charge function and a terminal charge function.

In addition, it is possible to exclude an additional circuit for providing the aromatic function to the terminal body by installing an aromatic supply part at a charging device, not the terminal body. Therefore, it is possible to supply an aromatic agent into an absorbent material in a terminal body when a terminal is charging and also supply an aromatic agent into the absorbent material in the terminal body even when the terminal is not being charged.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A mobile communication terminal having an aromatic function comprising:
    a terminal body comprising:
    a cover member body having an insertion space formed therein to accommodate an absorbent material,
    a plurality of holes formed in one surface of the cover member body to expose the insertion space to the exterior,
    an injection hole formed in the one surface of the cover member body to inject an aromatic agent, and
    an insertion hole formed in the other surface of the cover member body in communication with the insertion space to insert the absorbent material; and
    an opening/closing cap inserted into the insertion hole to open/close the insertion hole; and
    an absorbent material installed in the terminal body for absorbing the aromatic agent supplied from the exterior through the injection hole in the cover member, wherein the absorbent material is a sponge-like material.

2. The mobile communication terminal according to claim 1, wherein the absorbent material is a sponge-like material.

3. The mobile communication terminal according to claim 1, wherein the cover member is disposed at one side of the terminal body.

4. The mobile communication terminal according to claim 1, wherein the cover member is disposed at the other side of the terminal body.

5. The mobile communication terminal according to claim 1, wherein the cover member is disposed to cover the battery.

6. A terminal charger for charging a mobile terminal comprising;
    an absorbent material disposed therein; and
    a detachable cover member, comprising:
        an injection hole formed in a surface of a cover member body;
    the terminal charger comprising:
        a charger body having:
            a mounting space formed in which the terminal is mounted; and
            an installation hole for communicating between the mounting space and the charger body, wherein the installation hole and the injection hole are aligned such that an aromatic supply part installed in the installation hole supplies an aromatic agent into the absorbent material through the injection hole.

7. The terminal charger according to claim 6, wherein, said installation hole is formed at a certain angle with respect to a lower surface of the charger body.

8. The terminal charger according to claim 6, wherein the aromatic supply part comprises:
    a first body having a storage space for storing an amount of aromatic agent therein;
    a second body formed at one end of the first body to be in communication with the storage space and having a conical shape;
    a third body formed at a tip of the second body, to project by a certain length, to expose the storage space to the exterior;
    an opening/closing means having an opening/closing cone disposed in the second body and having a conical shape so as to be in contact with an inner surface of the second body, and a push rod extending from one end of the opening/closing cone through the third body; and
    a resilient member disposed in the first body to support a bottom surface of the opening/closing cone and an inner bottom surface of the first body.

9. The terminal charger according to claim 8, wherein the first body further comprises a main window formed of a transparent material.

10. The terminal charger according to claim 6, wherein the charger body further comprises a sub window formed of a transparent material to expose the installation hole to the exterior.

11. The terminal charger according to claim 6, wherein the installation hole is formed with:
    a first installation hole into which the third body is inserted and from which an end of the third body projects to the exterior of the mounting space,
    a second installation hole into which the second body is inserted, and
    a third installation hole into which the first body is inserted,
    wherein, an outer surface of the second body is threadedly engaged with an inner surface of the second installation hole.

12. The terminal charger according to claim 6, wherein the installation hole is inclined to form an acute angle with respect to a lower surface of the charger body.

13. The terminal charger according to claim 6, wherein the terminal comprises:
    a terminal body having a display window provided at one side thereof and a battery.

14. The terminal charger according to claim 13, wherein the detachable cover member further comprising:
    an insertion space formed therein to accommodate the absorbent material,
    a plurality of holes formed in one surface of the cover member body to expose the insertion space to the exterior,
    and
    an insertion hole formed in the cover member body and in communication with the insertion space to insert the absorbent material; and
    an opening/closing cap inserted into the insertion hole to open/close the insertion hole.

15. The terminal charger according to claim 14, wherein the cover member body is disposed at a first side of the terminal body.

16. The terminal charger according to claim 14, wherein the cover member body is disposed at a second side of the terminal body.

17. The terminal charger according to claim 13, wherein the cover member body is disposed to cover the battery.

18. A terminal charger for charging a mobile terminal having an absorbent material disposed therein, comprising:
- a charger body having a mounting space formed in which the terminal is mounted; and
- an aromatic supply part installed at the charger body for supplying an aromatic agent into the absorbent material, wherein the aromatic supply part comprises:
- a first body having a storage space for storing an amount of aromatic agent therein;
- a second body formed at one end of the first body to be in communication with the storage space and having a conical shape;
- a third body formed at a tip of the second body, to project by a certain length, to expose the storage space to the exterior;
- an opening/closing means having an opening/closing cone disposed in the second body and having a conical shape so as to be in contact with an inner surface of the second body, and a push rod extending from one end of the opening/closing cone through the third body; and
- a resilient member disposed in the first body to support a bottom surface of the opening/closing cone and an inner bottom surface of the first body.

* * * * *